(No Model.)

VAN DYKE CRUSER.
BICYCLE GEARING.

No. 525,694. Patented Sept. 11, 1894.

Witnesses:
L. C. Hills
E. H. Bond

Inventor:
Van Dyke Cruser;
by E. B. Stocking
Attorney.

UNITED STATES PATENT OFFICE.

VAN DYKE CRUSER, OF BROOKLYN, NEW YORK.

BICYCLE-GEARING.

SPECIFICATION forming part of Letters Patent No. 525,694, dated September 11, 1894.

Application filed February 15, 1894. Serial No. 500,266. (No model.)

*To all whom it may concern:*

Be it known that I, VAN DYKE CRUSER, a citizen of the United States, residing at Flatbush, Brooklyn, in the county of Kings and State of New York, have invented certain new and useful Improvements in Bicycle-Gearing, of which the following is a specification, reference being had therein to the accompanying drawings.
This invention relates to certain new and useful improvements in bicycles and more particularly to the gearing thereof, and it has for its objects among others to provide a simple and cheap attachment for the rear wheel of a bicycle whereby greater speed may be attained with a less expenditure of power than by the ordinary construction. I also provide a simple and improved chain-tightener which operates in conjunction with the gearing whereby the chain may be quickly and easily adjusted when necessary.

The improvement embodies a gear fast upon the hub of the rear wheel and meshing with an internal gear on the sprocket wheel, which is detachably connected with an eccentric on the axle and having a socket for the end of the hub, the said eccentric being provided with a ring and ball bearings being provided for all of the parts. This eccentric is adjustable on the axle and is also provided with means for connection with the frame of the wheel in such a manner that it can be adjusted and held relatively to the other parts so as to tighten or loosen the chain as occasion may require. A shield or plate may be employed for covering the pinion and gear and protect the same from the dust and dirt.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1:
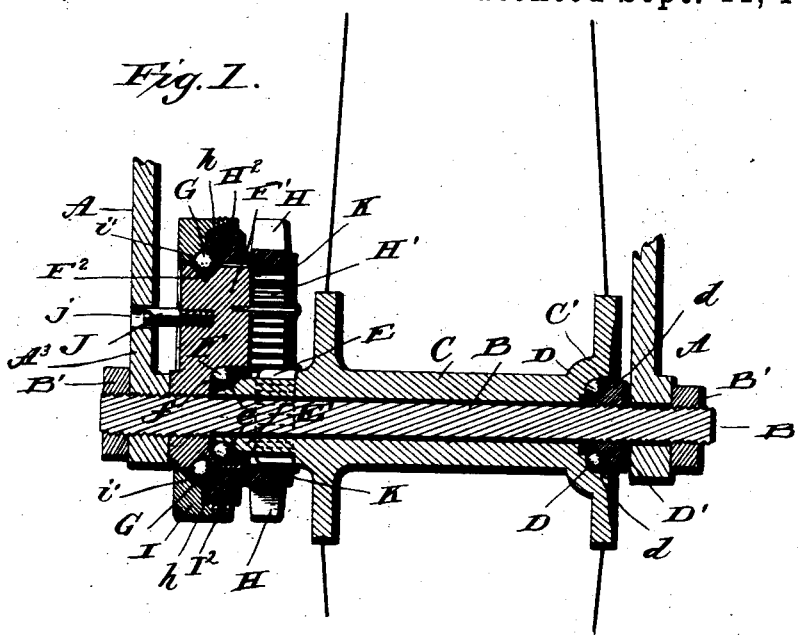
Figure 2:
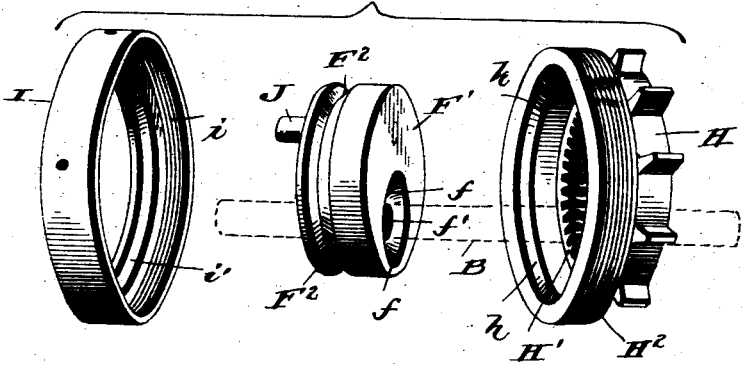
Figure 3:
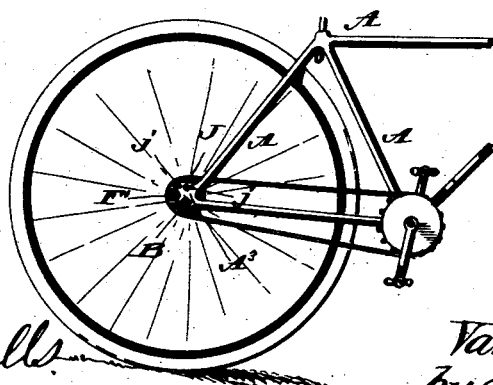

Figure 1 is a substantially central longitudinal section through the rear wheel of a bicycle equipped with my present improvements. Fig. 2 shows in perspective the parts comprising my invention, separated, but shown in their relative positions. Fig. 3 is a side elevation of the rear wheel with my improvements in place.

Like letters of reference indicate like parts throughout the several views.

Referring now to the details of the drawings by letter, A designates a portion of the frame of a bicycle of known construction except as hereinafter specified.

B is the rear axle having its ends screw threaded as shown in Fig. 1 to receive the nuts B' in the usual manner.

C is the hub of the wheel. It is formed at one end with a socket or channel C' adapted to receive the balls D which are held in place by the nut D' screwed on the axle and having an annular concave channel $d$ as seen in Fig. 1. Upon the hub of the wheel near its other end there is either fast or integral therewith a pinion E, beyond which is a tapered portion E' which is formed with an annular concave channel $e$ to receive the balls F as seen best in Fig. 1. These balls are retained in a tapered socket $f$ in an eccentric F' as shown in Fig. 1, the socket being seen also in Fig. 2, the eccentric having an opening $f'$ through the socket through which passes the axle B, the said opening being screw threaded as seen in Fig. 1 to engage the threads of the said axle. The hole $f'$ is eccentric with the part F' as shown and the said part F' is formed with a peripheral channel $F^2$ for the reception of the balls G.

H is the sprocket wheel. It is in the form of a ring with an internal gear H' with which the pinion E on the hub meshes, and with an exteriorly threaded ring portion $H^2$, the outer face of which is provided with a tapered wall $h$ as seen best in Fig. 1, to form a partial channel for the balls G to work in, and the threaded ring portion is adapted to receive the internally threaded flange $i$ of the ring I, the body portion of which is formed with a beveled wall $i'$ as seen best in Fig. 1 to form the complement of the channel for the balls G. This ring embraces the eccentric as seen in Fig. 1. The flange of this ring is secured to the eccentric by suitable means, as the screws $I^2$, as shown in Fig. 1.

The eccentric F' is held to the frame of the machine by a screw J which is passed through an opening j in the frame and into the eccentric as shown in Figs. 1 and 3. A plurality of these openings j are provided in the frame which is provided with an enlargement $A^3$ for this purpose as seen in Fig. 3, the openings being formed on the arc of a circle as seen in Fig. 3.

In operation, the pinion on the hub and the internal gear revolve in the same direction but at different rates of speed thus causing little or no friction, and by the construction shown and described a rider does not have to pedal so fast or make his feet go so fast to obtain greater speed and the speed can be attained with greater ease as the slow movement of the feet is easier and less tiring. The improvement is applied between the frame and the wheel as seen in Figs. 1 and 3 and simply necessitates the making of the axle slightly longer than usual. The gearing may be made any size and any pitch to suit the rider.

By removing the screw J and moving the eccentric backward or forward as the case may require and then inserting the screw in the proper hole the chain may be tightened or loosened and the eccentric held in its adjusted position.

If desired a plate or cover K may be employed as shown in Fig. 1 to cover and protect the gearing and pinion.

Modifications in detail may be resorted to without departing from the spirit of the invention or sacrificing any of its advantages.

What I claim as new is—

1. The combination with the axle and the eccentric thereon, of the sprocket wheel with internal gear, the wheel-hub with pinion meshing with said gear, and the frame with a plurality of holes and a removable screw engaging one of said holes and the eccentric whereby the chain may be adjusted by adjustment of said screw, substantially as specified.

2. The combination with the axle and the eccentric thereon, of the sprocket wheel with internal gear, the wheel-hub with its pinion meshing with said gear, and the plate secured to the eccentric and arranged upon the inner face of the sprocket wheel for covering said gear and pinion, substantially as specified.

3. The combination with the rear axle, of the eccentric fast thereon, the wheel-hub with its pinion, the sprocket wheel with its internal gear and the ring movable with the sprocket wheel about the eccentric, and a screw removably held in the frame for engaging the eccentric to adjust the chain substantially as specified.

In testimony whereof I affix my signature in presence of two witnesses.

VAN DYKE CRUSER.

Witnesses:
G. MOWLERN,
JOSEPH T. SMITH.